June 5, 1962   G. LE PARQUIER ETAL   3,038,155
RADAR NOISE SUPPRESSING SYSTEM
Filed May 1, 1956
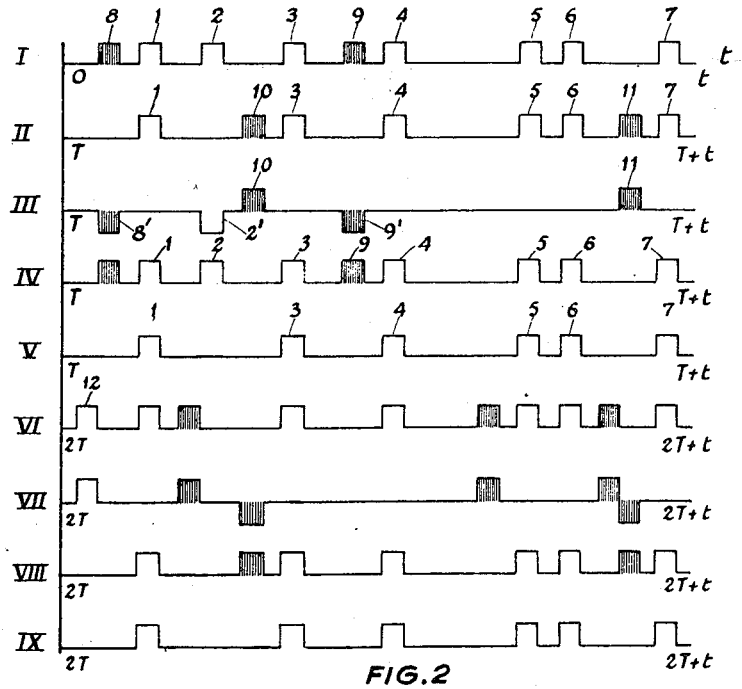
FIG. 2
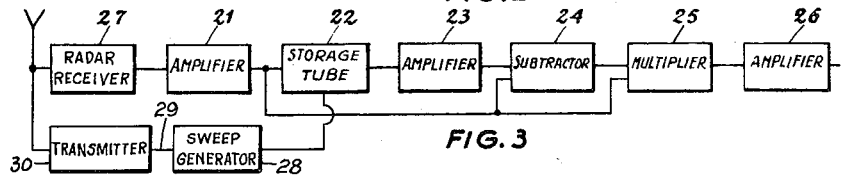
FIG. 3
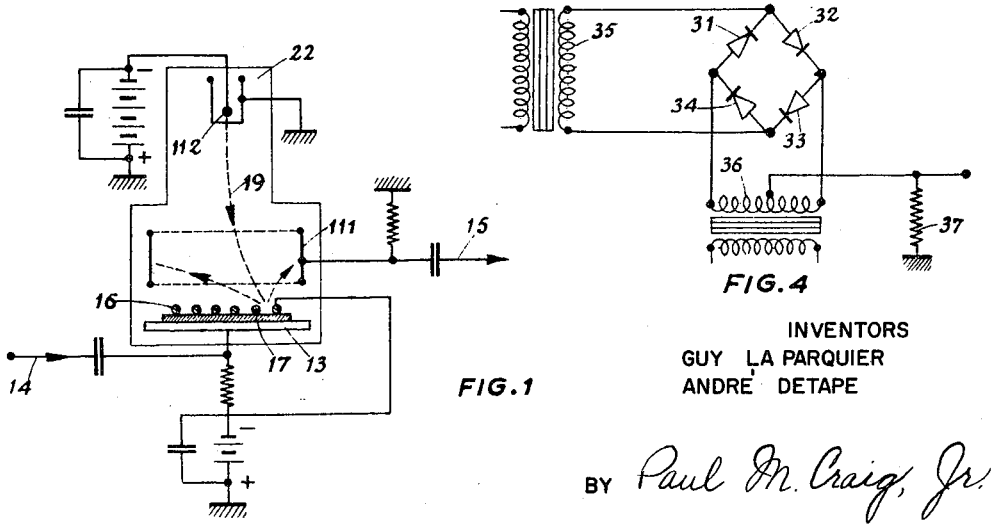
FIG. 4
FIG. 1
INVENTORS
GUY LA PARQUIER
ANDRE DETAPE
BY Paul M. Craig, Jr.
ATTORNEY United States Patent Office 3,038,155
Patented June 5, 1962

3,038,155
RADAR NOISE SUPPRESSING SYSTEM
Guy Le Parquier and André Detape, Paris, France, assignors to Compagnie Generale de Telegraphie sans Fil, a corporation of France
Filed May 1, 1956, Ser. No. 581,945
Claims priority, application France May 2, 1955
2 Claims. (Cl. 343—17.1)

The present invention relates to a method and a system adapted to improve the sensitivity of radar systems, more particularly where the received echoes are of low intensity.

In conventional radars, recurrent echoes, reflected by obstacles, or targets, are present in the receiver along with various random noises and noise resulting from jamming. These noises may be analyzed into a noise background of substantially constant level, and into noise peaks of distinctly higher amplitude, emerging from the latter.

These noise peaks are particularly harmful in so far as the quality of the reception is concerned. They cause the appearance, on a P.P.I.-screen, of "false echoes," which can not always be readily discriminated from the true echoes, and which, in any case, make the observation of the latter much more difficult for the operator. Further, the permanent noise background causes the cathode of the indicator to emit a continuous beam, the mean intensity value of this beam being a function of the mean noise level. The sensitivity of the screen is thereby reduced and the images are prone to be blurred, while the track on the screen of the mobile targets to be detected is shortened.

It is an object of the present invention to eliminate these drawbacks.

More precisely it is an object of the invention to combine two consecutive sequences of echo signals, due to two successively transmitted pulses, in order to eliminate the random echoes, while preserving the recurrent signal echoes. Each of the successive echo signal sequences has a well defined time origin coinciding with the transmission of the radar pulse from which the corresponding echo signals originate.

According to the invention this is performed by delaying the first of the two consecutive sequences by a period T, equal to the recurrence period of the radar pulse signals, thereby causing the two sequences to coincide in time, and then multiplying the signals of this sequence by the corresponding signals of the other sequence. When no singal corresponds in one sequence to a signal present in the other sequence, this is tantamount to multiplying this latter signal by zero. Since, as a rule, the noises rarely coincide in both sequences, they are eliminated. By the same token, echo signals which are not repeated in two consecutive sequences are also eliminated, but obviously this is by no means harmful.

According to the invention, the delaying operation is advantageously performed by a special storage tube, as will be described hereinafter, associated with a subtracting circuit.

The invention will be better understood from the following specification, taken in connection with the accompanying drawings, wherein:

FIG. 1 is a simplified diagram of a known storage tube that may be used according to the invention;

FIG. 2 is a series of graphs illustrating the successive operating steps according to the invention, resulting in an improvement of the signal-to-noise ratio and in the suppression of the high amplitude noise peaks;

FIG. 3 diagrammatically shows an embodiment of a device according to the invention;

FIG. 4 is a diagram of a device of known type, for effecting the multiplication of the signals in the system according to the invention.

The storage tube employed in the device according to the invention is very diagrammatically illustrated in FIG. 1. This tube, known as "backplate-modulation" tube, is more particularly described in the work "Storage Tubes and Their Basic Principles" by M. Knoll and B. Kazan (John Wiley & Sons, New York, 1952, pages 62 to 65). Accordingingly, it is felt that it is not necessary to describe the same in detail here. Briefly, this tube comprises essentially an electron gun 112, a deflecting system, not shown in the figure, for scanning a screen 17 of dielectric material, the back of which is covered with a conducting sheet 13, hereafter referred to as a "back-plate," a grid 16 located in front of the screen, and a ring shaped collector 111 for collecting the secondary electrons.

The input signal is applied at 14 to the back-plate 13, the output signal being collected at 15.

This tube displays an essential feature of which the invention avails itself: the output signal does not correspond to the input signal, but to the difference between the signals which have been applied to the back-plate of the tube, during the last two scanning operations.

FIG. 2 diagrammatically shows the successive operations effected in the system according to the invention.

For the sake of clarity and without, of course, limiting thereto the scope of the invention, it will be assumed that the radar illustrated is of the P.P.I. type, wherein a conventional radar aerial scans the surrounding space during its rotation and transmits pulses, having a recurrence period T. As a rule, targets located along successively scanned paths receive a plurality of pulses during a same passage of the beam on said target.

In the graphs shown, the selected of time origin or zero time, is the time at which a transmission pulse starts. Cross-hatched signals represent random noise signals, other signals corresponding to echo signals. For the sake of simplicity, noise signals have been shown as rectangular pulses of the same duration as the useful echo pulses, but they may have of course any other form or duration. It will be readily seen that the system of the invention operates in the same way whatever this form of duration.

Graph I shows a first sequence of signals corresponding to a first pulse, received by the radar receiver, and fed to the back-plate 13 of the storage tube in FIG. 1. The writing of this sequence of signals is obtained by scanning the screen 17 with the beam 19, this scanning being synchronized, by any known means, with the pulse transmitter, in such a way that zero instant of the scanning coincides with the beginning of the transmission of a pulse. The beam radiated by the radar meets a plurality of targets, located at various distances therefrom, and which reflect towards the receiver echoes 1, 2, 3, 4, 5, 6 and 7 respectively. These echoes are written on the memory tube during a first scanning operation, simultaneously with random noise signals, such as 8 and 9, which have, of course, the same effect on the indicator as the echo signals and which the present invention is aimed at suppressing.

Graph II represents the second sequence of received signals, corresponding to a second transmitted pulse, and it is, in turn, written on the back-plate 13 of the storage tube. The writing scanning of this sequence is shifted, with respect to the one just described, by one recurrence period T of the transmitted pulses. By way of example, the second transmitted pulse is assumed to meet the same targets as the first pulse, with the exception, however, of the target corresponding to echo 2 appearing in Graph I, which is supposedly at that time no more on the path of the radiated beam. Recurrent echoes 1, 3, 4, 5, 6 and 7 are thus written, as well as random noise signals 10 and 11, which appear this time in the receiver and are, as a rule, distinct from noise signals 8 and 9.

As explained hereinbefore, when recalling the principle of the memory tube used in the system according to the invention, the signals in Graph III, which are collected on the output 15 of this tube, result from the difference between the last two writings, i.e. the signals of Graph III are equal to the respective differences of Graph II and Graph I signals. These signals appear with the polarity resulting from this subtraction. It may be readily seen that the only signals to subsist in Graph III are those which, as for instance echo signal 2', did not appear during both considered scannings, as well as all of the random noise signals, such as 8', 9', 10 and 11, which occurred during the two scannings concerned respectively, and which do not, as a rule, coincide. The signals which are collected on the collector 111 of the storage tube and appear in Graph III, are then subtracted from the corresponding signals shown in Graph II.

The signals thus obtained are represented in Graph IV, and it may be readily seen that this diagram is an image of Graph I, with this essential difference that the signals have been delayed by a duration T, equal to the recurrence period of the transmitted signals.

Consequently, the storage tube has operated as a delay line in combination with the subtractor, the delay concerned being equal to the recurrence period of the radar transmitter.

If now, each signal appearing in Graph II, is multiplied by the corresponding signal appearing in Graph IV or by zero, as the case may be, the sequence of Graph V is provided where only echo-signals 1, 3, 4, 5, 6 and 7 appear. All the noise signals and also the signals which do not appear both in Graph II and in Graph IV are eliminated, which is the result desired.

The same method is then repeated for subsequent scanning operations, and for a better understanding thereof, FIG. 2 also comprises Graphs VI, VII, VIII and IX, which start all at the instant 2T and which must be understood as follows:

Graph VI: representing the writing of a third sequence of signals on the back-plate of the storage tube; a new echo signal 12 and other random noises appear in the signal sequence of this diagram.

Graph VII: representing the signals collected on the collector 111 of the storage tube, i.e. signals of Graph VI (third sequence) minus signals of Graph II (second sequence).

Graph VIII: Signals of Graph VII are subtracted from signals of Graph VI, which restitutes an image signal corresponding to the second sequence (Graph II), with a shift in time equal to T.

Graph IX: Signals of Graph VI (third sequence) are respectively multiplied by corresponding signals of the time delayed image thereof in Graph VIII, giving the signal corresponding to the second writing, free of any noise, and so on.

FIG. 3 shows an embodiment of the device according to the invention. A video-frequency amplifier 21, incorporated in a conventional radar receiver 27, feeds simultaneously a storage tube 22, of the type previously described, a subtractor 24 and a multiplier 25.

The scanning of the screen of storage tube 22 is effected, for instance, as known in the art, by means of sweep generator 28, which applies to the horizontally deflecting system of the tube sawtooth waves the beginning of which coincide with the transmission of the successively transmitted radar pulses. Control input 29 of sweep generator 28 is connected to the radar transmitter 30, and the synchronization of the sawtooth waves is effected by supplying to control input 29 the synchronizing pulses which in every radar transmitter are generated by a synchronizing pulse generator to initiate the transmission of the radar pulses, and to synchronize the scanning of the radar indicator with the transmission of the radar pulses. If a bidimensional scanning of the screen is used, both the sweep generators are synchronized by the radar synchronizing pulses.

Simultaneously, the output of storage tube 22 is fed to subtractor 24 and the output of the subtractor is fed to a multiplier 25, the output of which is applied to an amplifier 26 which feeds the conventional circuits (not shown).

The device according to the invention operates to perform the above indicated operations. The video-frequency signal obtained at the output of a conventional radar receiver 27 is, firstly, amplified by amplifier 21 to raise it to a suitable amplitude to operate storage tube 22.

Storage tube 22, shown in more detail on FIG. 1, receives the signal voltage on its back-plate 13 and the screen of the tube is scanned by the cathode beam 19, emitted by gun 112 with a recurrence period T, equal to that of the transmission pulses. The signal collected on the collector 111 of the tube 22 which is strongly attenuated, is then amplified by means of an amplifier 23.

The subtraction of the signals, respectively shown on Graphs II and III of FIG. 2, is effected by any conventional means, for instance, by feeding these signals, in opposition to a resistor, the resulting signal being collected at the middle point of this resistor.

The multiplier circuit used in the device, according to the invention, is also of any suitable known type. One such circuit is shown by way of example in FIG. 4. It comprises a loop circuit of known type, formed by four detectors 31, 32, 33, 34, with square-law characteristics, fed diagonally by two symmetric transformers 35 and 36, capable of transmitting the signals to be multiplied. The signal resulting from the multiplication is collected between the middle point of one of the transformers and the ground, for instance, across the resistor 37. The resulting signal is amplified by amplifier 26 which supplies the signal to the conventional indicator or display circuits.

As already mentioned, the output of the system of FIG. 3 is practically immune from noise and in any case accompanied by much less noise than is usually the case. Further noise signals due to the memory tube itself are also substantially eliminated. Thus the system according to the invention highly enhances the sensitivity of the radar especially when the received echoes are weak. The image on the indicator screen is much more clear than is usually the case, and consequently, the inspection is easier for the operator. The echoes are highly reinforced and stand out against a dark background, with only a very scanty and weak background noise.

It is to be noted that the invention may be generally applied to any recurrent signal sequences, which are substantially identical from one sequence to the next.

Of course, the invention is in no wise limited to the embodiments illustrated and described which have been selected by way of example only.

What we claim is:

1. A system for improving, by substantial elimination of random noise signals, the reception of recurrent signal sequences, each of said sequences having a time origin, and the useful signals of said sequences being substantially identical from one sequence to the next, said system comprising: means for receiving and detecting said signal sequences; a storage tube of the backplate modulation type, said storage tube having a gun for generating an electron beam, a storage screen, an input and an output; means for repeatedly scanning said screen with said beam so that the beginnings of the successive scannings coincide with each of said time origins; a subtractor circuit having a first and a second input, and an output, said subtractor circuit delivering on its output a voltage proportional to the difference between the voltages simultaneously applied to its second and to its first inputs respectively, said first input of said subtractor circuit being coupled to said output of said storage tube; a multiplying circuit having a first and a second input, and an output, said multiplying circuit delivering on its output a voltage proportional to the product of the voltages simultaneously applied to its first and its second inputs respectively, said first input of said multiplying circuit being coupled to said output of said subtractor circuit; and means for applying said detected sequences to said input of said storage tube, to said second input of said subtractor circuit and to said second input of said multiplying circuit.

2. In a radar system comprising means for transmitting recurrent pulses and means for receiving and detecting the echo signal sequences corresponding respectively to said transmitted pulses, a noise eliminating system comprising: a storage tube of the backplate modulation type, having a screen, a gun for generating an electron beam, an input and an output; means for repeatedly scanning said screen with said beam so that the beginning of each scanning coincides in time respectively with the transmission of each of said transmitted pulses; a subtractor circuit having a first and a second input, and an output, said subtractor circuit delivering on its output a voltage proportional to the difference between the voltages simultaneously applied to its second and to its first inputs respectively, said first input of said subtractor circuit being coupled to said output of said storage tube; a multiplying circuit having a first and a second input, and an output, said multiplying circuit delivering on its output a voltage proportional to the product of the voltages simultaneously applied to its first and its second inputs respectively; said first input of said multiplying circuit being coupled to said output of said subtractor circuit; and means for applying said detected sequences to said input of said storage tube, to said second input of said subtractor circuit and to said second input of said multiplying circuit.

References Cited in the file of this patent

UNITED STATES PATENTS

| | | |
|---|---|---|
| 2,430,038 | Wertz | Nov. 4, 1947 |
| 2,480,038 | Mason | Aug. 23, 1949 |
| 2,487,995 | Tucker | Nov. 15, 1949 |
| 2,659,079 | Cunningham | Nov. 10, 1953 |
| 2,710,943 | Doelz | June 14, 1955 |
| 2,842,761 | Downs | July 8, 1958 |

OTHER REFERENCES

Proceedings of the I.R.E. No. 38, issue 10, pp. 1197–1203, October 1950.